United States Patent
Ording

(10) Patent No.: US 9,396,565 B2
(45) Date of Patent: Jul. 19, 2016

(54) RENDERING BORDERS OF ELEMENTS OF A GRAPHICAL USER INTERFACE

(71) Applicant: Apple Inc., Cupertino, CA (US)

(72) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 13/913,368

(22) Filed: Jun. 7, 2013

(65) Prior Publication Data
US 2014/0362089 A1    Dec. 11, 2014

(51) Int. Cl.
*G06T 11/20* (2006.01)
*G06F 3/048* (2013.01)

(52) U.S. Cl.
CPC .............. *G06T 11/203* (2013.01); *G06F 3/048* (2013.01)

(58) Field of Classification Search
CPC .............................. G06T 11/203; G06F 3/048
See application file for complete search history.

(56) References Cited

U.S. PATENT DOCUMENTS

| | | | |
|---|---|---|---|
| 5,119,309 A * | 6/1992 | Cavendish et al. | 700/182 |
| 5,428,733 A | 6/1995 | Carr | |
| 7,461,343 B2 | 12/2008 | Kates | |
| 8,049,753 B2 | 11/2011 | Andersson | |
| 8,315,479 B1 | 11/2012 | Gilra | |
| 8,564,544 B2 | 10/2013 | Jobs | |
| 2012/0221973 A1 | 8/2012 | Chaudhri | |
| 2013/0084430 A1 | 4/2013 | Hill et al. | |
| 2013/0174097 A1 * | 7/2013 | Wernecke | 715/846 |
| 2013/0187858 A1 * | 7/2013 | Griffin et al. | 345/168 |
| 2014/0198945 A1 * | 7/2014 | Hsiao et al. | 382/103 |

FOREIGN PATENT DOCUMENTS

| | | |
|---|---|---|
| EP | 132134 A2 | 1/1985 |
| EP | 747804 A1 | 12/1996 |
| EP | 1132866 A2 | 9/2001 |
| EP | 1177529 A1 | 2/2002 |
| JP | H06-61090 | 8/1994 |
| KR | 10-2008-0111450 | 12/2008 |
| WO | WO2008067621 A3 | 7/2008 |

OTHER PUBLICATIONS

Koon, "A Case Study of Icon-Scenario Based Animated Menu's Concept Development", IEEE Microwave Magazine, v. 6, n. 1, p. 36, Mar. 1, 2005.
pages from iOS Human Interface Guidelines, Apple Inc., May 1, 2013, 20 pages.
Rounded Corners Using CSG Modeling—MATLAB & Simulink, downloaded May 24, 2013 from http://www.mathworks.com, 2 pages.

* cited by examiner

*Primary Examiner* — James A Thompson
*Assistant Examiner* — Tapas Mazumder
(74) *Attorney, Agent, or Firm* — Fish & Richardson P.C.

(57) ABSTRACT

Systems and methods are described to render borders of controls and indicators in a graphical user interface (GUI), such that the rendered borders have continuous curvatures. In one aspect, a method includes generating a border of a GUI element to be represented in a GUI. The border includes a first straight side, a second straight side, and a corner portion that joins together the first straight side and the second straight side, such that a portion of the border that includes the first straight side, the corner portion and the second straight side is continuous and has continuous curvature. Additionally, the method includes representing the GUI element in the GUI.

29 Claims, 9 Drawing Sheets

```
                                                                    408                    From              400 (cont.)
        var ww = this.bounds.width                                                         FIG. 4A
        var hh = this.bounds.height
```

```
    //// make shape                                                                                                 410 var theShape = new Path()
416
        // bottom left corner              Q₁
                                      Q₂    Q₃    Q₄
        theShape.moveTo(aa, 0)
        theShape.curveTo(bb, 0, cc, 0, dd, ee)
        theShape.curveTo(gg, ff, ff, gg, ee, dd)  // circle part
        theShape.curveTo( 0, cc,  0, bb,  0, aa)                        417
        theShape.lineTo(0, hh - aa)                   R₁        // left side line
420                                       R₂   R₃   R₄
        // top left corner theShape.curveTo(0 , hh - bb,  0, hh - cc, ee, hh - dd)
        theShape.curveTo(ff, hh - gg, gg, hh - ff, dd, hh - ee) // circle part
        theShape.curveTo(cc, hh    , bb, hh    , aa, hh    )

theShape.lineTo(ww - aa, hh)  // top line        421
424
        // top right corner theShape.curveTo(ww - bb, hh     , ww - cc, hh    , ww - dd, hh - ee)
        theShape.curveTo(ww - gg, hh - ff, ww - ff, hh - gg, ww - ee, hh - dd) // circle part
        theShape.curveTo(ww     , hh - cc, ww     , hh - bb, ww     , hh - aa)

theShape.lineTo(ww, aa)  // right side line       425
428
        // bottom right corner theShape.curveTo(ww, bb, ww, cc, ww - ee, dd)
        theShape.curveTo(ww - ff, gg, ww - gg, ff, ww - dd, ee) // circle part
        theShape.curveTo(ww - cc, 0, ww - bb, 0, ww - aa, 0)

theShape.lineTo(aa, 0) // bottom line      429 theShape.closePath()
```

FIG. 4B

RENDERING BORDERS OF ELEMENTS OF A GRAPHICAL USER INTERFACE

TECHNICAL FIELD

This specification relates generally to rendering borders of controls and indicators in a graphical user interface, and more specifically to rendering borders with continuous curvatures.

BACKGROUND

A graphical user interface (GUI) allows a number of graphical representations of operating system objects to be rendered on a display screen at the same time. The graphical representations of system objects, e.g., controls and indicators, can be displayed in the GUI according to the needs of a user. Examples of GUI indicators include alerts, windows, and icons representing files and/or hardware. Examples of GUI controls include icons representing applications and operating system functions, taskbars, menus, virtual buttons, and a keyboard representation. In general, the GUI controls provide mechanisms for accessing and activating, or both, the system objects corresponding to the displayed representations.

The graphical representations of operating system objects, or simply the GUI elements, are typically presented in the GUI in a manner that is conducive to a pleasant user experience. Esthetic aspects of the GUI may contribute to such pleasant user experience. An esthetic aspect of some GUIs involves rendering the GUI elements within respective borders with sharp corners, such that adjacent straight sides of each of the borders meet at one point. In this case, a GUI element rendered in these GUIs has a continuous border with discontinuous slope at the corners. The border slope is determined as a first derivative of a geometrical function that represents the border.

Another esthetic aspect of other GUIs involves rendering the GUI elements within respective borders that have rounded corners, such that the adjacent straight sides of each of the borders are joined together through an elliptical arc, e.g., a circular arc. In this case, both the border and its slope are continuous for a GUI element rendered in the latter GUIs.

SUMMARY

Systems and techniques described in this specification can be used to render a border of a control or an indicator in a graphical user interface, where the border has one or more rounded corners, such that both the border and its curvature are continuous. The border curvature is determined from a second derivative of the geometrical function that represents the border.

In general, one aspect of the subject matter described in this specification can be implemented in a system that includes one or more processors; and non-transitory computer readable medium encoding instructions that, when executed by the one or more hardware processors, cause the system to render a border on a display device associated with the system. The border includes a first straight side, a second straight side, and a corner portion that joins together the first straight side and the second straight side, such that a portion of the border that includes the first straight side, the corner portion and the second straight side is continuous and has continuous curvature.

The foregoing and other implementations can each optionally include one or more of the following features, alone or in combination. In some implementations, the corner portion can include a first non-circular portion and a second non-circular portion, such that proximate ends of the first and second non-circular portions have a common curvature and distal ends have zero curvature.

In some implementations, the corner portion can include a circular portion with a radius corresponding to the common curvature, and the circular portion can be connected with the first straight side through the first non-circular portion and with the second straight side through the second non-circular portion. For instance, a length of the combined first and second non-circular portions can be a specified fraction of a length of the corner portion. Moreover, the radius of the circular portion and the fraction can be pre-specified.

In some implementations, the first and second non-circular portions can be B-spline curves. For example, the B-spline curves are Bezier curves. Moreover, the Bezier curves can be 3rd order Bezier curves. As another example, the B-spline curves are non-uniform rational basis spline (NURBS) curves. In some implementations, the first and second non-circular portions can be portions of Euler spirals.

In some implementations, the border can be rendered in a graphical user interface GUI. For example, the border is part of an icon representation of the GUI. As another example, the GUI can include a keyboard representation, and the border is part of a representation of a key from among a plurality of keys of the keyboard representation. As yet another example, the border is part of a text box representation of the GUI. As another example, the border is part of an image representation of the GUI.

In general, another aspect of the subject matter described in this specification can be implemented in a system that includes means for generating a border of a control or indicator to be rendered in a graphical user interface (GUI). The border includes a first straight side, a second straight side, and a corner portion that joins together the first straight side and the second straight side, such that a portion of the border that includes the first straight side, the corner portion and the second straight side is continuous and has continuous curvature. The system also includes a hardware processor to render the border of the control or indicator in the GUI.

The foregoing and other implementations can each optionally include one or more of the following features, alone or in combination. In some implementations, the corner portion can include a first non-circular portion and a second non-circular portion, such that proximate ends of the first and second non-circular portions have a common curvature and distal ends have zero curvature.

In some implementations, the means for generating the border can be configured to receive specification (A) of a fraction of a length of the corner portion represented by a length of the combined first and second non-circular portions, and (B) of a radius corresponding to the common curvature; determine a Bezier curve that has (i) maximum curvature corresponding to specified radius at a point located half-way between its end points, (ii) zero curvature at the end points, and (iii) a length equal to the fraction of the length of the corner portion; and generate (I) the first non-circular portion as half of the Bezier curve and (II) the second non-circular portion as a mirrored-instance of the half of the Bezier curve with respect to a bisector of an angle between the first and second straight sides, such that each of the first and second non-circular portions has zero curvature at one end and the common curvature corresponding to the specified radius at the other end. For example, the Bezier curve is a 3rd order Bezier curve.

In some implementations, the corner portion further can include a circular portion with a radius corresponding to the common curvature, and the circular portion can be connected with the first straight side through the first non-circular portion and with the second straight side through the second non-circular portion. For example, the circular portion is a circular arc. As another example, the circular portion is approximated by a B-spline curve.

In general, another aspect of the subject matter described in this specification can be implemented in a method that includes generating a border of a control or indicator to be represented in a graphical user interface (GUI). The border includes a first straight side, a second straight side, and a corner portion that joins together the first straight side and the second straight side, such that a portion of the border that includes the first straight side, the corner portion and the second straight side is continuous and has continuous curvature. Additionally, the method includes representing the border of the control or indicator in the GUI.

The foregoing and other implementations can each optionally include one or more of the following features, alone or in combination. In some implementations, the corner portion can include a first non-circular portion and a second non-circular portion, and generating the border includes arranging the first and second non-circular portions to have zero curvature at distal ends and a common curvature at proximal ends.

In some implementations, generating the border includes receiving specification (A) of a fraction of a length of the corner portion represented by a length of the combined first and second non-circular portions, and (B) of a radius corresponding to the common curvature; determining a B-spline curve that has (i) maximum curvature corresponding to specified radius at a point located half-way between its end points, (ii) zero curvature at the end points, and (iii) a length equal to the fraction of the length of the corner portion; and generating (I) the first non-circular portion as half of the B-spline curve and (II) the second non-circular portion as a mirrored-instance of the half of the B-spline curve with respect to a bisector of an angle between the first and second straight sides, such that each of the first and second non-circular portions has zero curvature at one end and the common curvature corresponding to the specified radius at the other end. For example, the B-spline curve is a Bezier curve. Moreover, the Bezier curve can be a 3rd order Bezier curve.

In some implementations, the corner portion can include a circular portion with a radius corresponding to the common curvature, and generating the border includes connecting the circular portion with the first straight side through the first non-circular portion and with the second straight side through the second non-circular portion. For example, generating the border includes generating the circular portion as a circular arc. As another example, generating the border includes generating the circular portion as a B-spline curve.

Particular implementations of the subject matter described in this specification can be configured so as to realize one or more of the following potential advantages. Representations of controls and/or indicators rendered in a GUI within respective borders having rounded corners, which include the disclosed first and second non-circular portions, can potentially cause a better user experience compared to representations of the same controls and/or indicators rendered in the GUI within respective borders having rounded corners defined by elliptical arcs. The reason for the better user experience in the former case is that representation of a border with continuous curvature, like the disclosed borders, tends to be more pleasing esthetically compared to representation of a border that has two curvature mismatches for of each rounded corner. In the latter case, the curvature mismatches occur where adjacent straight sides of the border join the elliptical arc of the corner.

Details of one or more implementations of the described subject matter are set forth in the accompanying drawings and the description below. Other features, aspects, and potential advantages will become apparent from the description, the drawings, and the claims.

BRIEF DESCRIPTION OF THE DRAWINGS

FIGS. 4A-4C show aspects of a system used to render a corner of a border with continuous curvature for a GUI element.

Like reference numbers and designations in the various drawings indicate like elements.

DETAILED DESCRIPTION

Figure 1A:
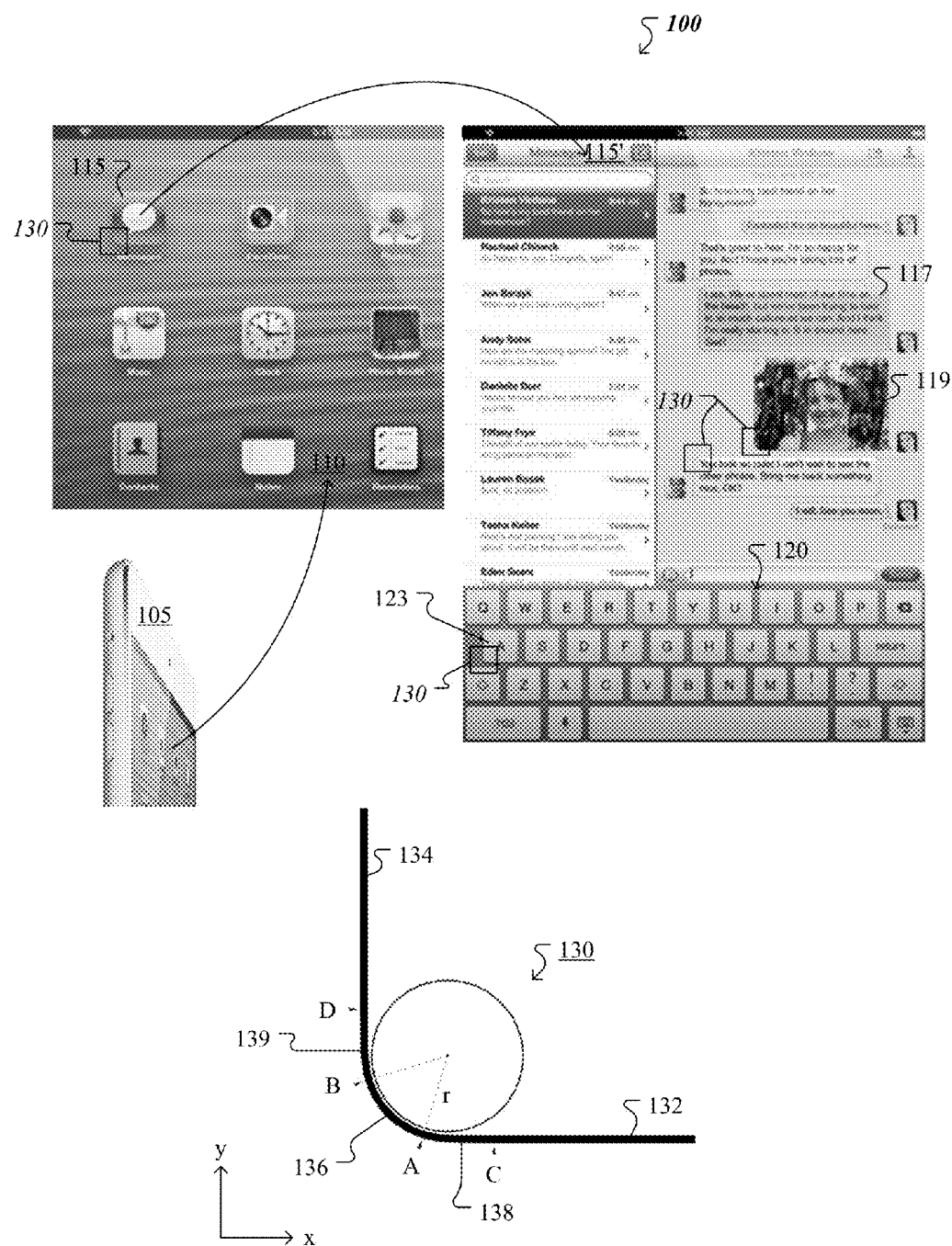
FIG. 1A shows an example of a system used to render GUI elements that have borders with continuous curvatures.

FIG. 1A shows an example of a system 100 used to render GUI elements that have borders with continuous curvatures. The system 100 includes one or more computer systems 105. The computer systems 105 can include a smart phone, a tablet computer, a laptop computer, a workstation, a media player device or a wearable computer. Other examples of computer systems 105 along with multiple of their components are described in detail below in connection with FIG. 5.

The computer system 105 includes one or more hardware processors and at least one display device. The one or more hardware processors are configured to present on the display device one or more GUIs through which a user of the computer system 105 can interact with it. For example, a GUI 110 is presented on the display device of the computer system 105 to enable the user to access functions of the computer system 105 and/or applications that can be run on the computer system 105. The GUI 110 represents an operating system-level GUI. In this case, GUI elements represented in the portion of the GUI 110 shown in FIG. 1A are icons 115 of the applications. Although not shown in FIG. 1A, other elements of the GUI 110 can be notification indicators, taskbars, and the like.

As another example, a GUI 115' is presented on the display device of the computer system 105 once a user selects an application associated with the icon 115. In some implementations, when the computer system 105 has a single display device, the GUIs 110 and 115' are presented sequentially. In other implementations, when the computer system 105 includes, e.g., a smart phone and another wearable computing device, the GUIs 110 and 115' can be displayed concurrently: one on a display device of the smart phone and the other one on a display device of the wearable computing device.

The GUI 115' represents an application-level GUI. In this case, GUI elements represented in the portion of GUI 115' shown in FIG. 1A are, among other things, text indicators 117, image indicators 119, and a text-entry control 120, which in this case is a representation of a keyboard. The keyboard representation 120 is a multi-element GUI control, which includes representations of keys 123, such that each key-representation enables a user to provide an associated alphanumeric character to the computer system 105, in this case for use by the application 115.

The controls 115, 120, 123 are examples of GUI elements that are rendered, by the one or more hardware processors in the GUIs 110, 115', within respective borders, such that each border has rounded corners 130, and both the border and its curvature are continuous. The indicators 117, 119 are examples of GUI elements that are rendered, by the one or more hardware processors in the GUI 115', within respective borders, such that each border has three rounded corners 130 and the remaining corner is shaped as a call-out. In this case, the border is continuous, and so is curvature of a portion of the border that excludes the call-out shaped corner. Note that the border curvature is determined from a second derivative of the geometrical function that represents the border.

FIG. 1A further shows a zoom-in view of a border for a GUI element in the vicinity of a rounded corner 130. Here, a Cartesian coordinate system is provided for reference. This portion of the border includes a portion of a first straight side 132 of the border, the rounded corner 130, and a portion of a second straight side 134 of the border, adjacent to the first straight side 132. As this example represents the lower-left corner of the border, the first straight side 132 extends along the x-axis, from the lower-right corner of the border (located on the east-side of the second straight side 134 and not shown in FIG. 1A) to point C. Further, the second straight side 134 extends along the y-axis, from the upper-left corner of the border (located on the north-side of the first straight side 132 and not shown in FIG. 1A) to point D. The rounded corner 130, also referred to as a corner portion 130, joins together the first and second straight sides 132, 134 and extends from point C to point D. Moreover, the corner portion 130 is shaped such that the portion of the border that includes the first straight side 132, the corner portion 130 and the second straight side 134 is continuous and has continuous curvature.

The corner portion 130 includes a first non-circular portion 138 and a second non-circular portion 139. Moreover, the first and second non-circular portions 138, 139 are shaped and arranged such that proximate ends of the first and second non-circular portions 138, 139 have a common curvature and distal ends have zero curvature. In the example shown in FIG. 1A, the first non-circular portion 138 extends from point C to point A, and the second non-circular portion 139 extends from point B to point D. Note that curvature of the first non-circular portion 138 (or the second non-circular portion 139) is determined from a second derivative of a geometrical function that represents the first non-circular portion 138 (or another geometrical function that represents the second non-circular portion 139).

Optionally, the corner portion 130 further includes a circular portion 136 that joins together the first and second non-circular portions 138, 139. In the example shown in FIG. 1A, the circular portion 136 extends from point A to point B, and can be a circular arc with a radius "r" corresponding to the common curvature.

The first non-circular portion 138 is shaped to have zero curvature at its end point C, where it joins the first straight side 132. As the curvature of the first non-circular portion 138 matches the zero curvature of the first straight side 132, the border has continuous curvature at point C. Moreover, a radius of curvature of the border at point C has infinite value.

Further, the curvature of the first non-circular portion 138 is configured to continuously change and to reach a maximum absolute curvature value at the end point A of the first non-circular portion 138. As described above, the maximum absolute curvature value at point A for the first non-circular portion 138 is equal to an absolute curvature value at point B for the second non-circular portion 139. Moreover, a radius of curvature of the border at point A has a minimum value, "r".

The second non-circular portion 139 is shaped to have a maximum absolute curvature value at the end point B of the second non-circular portion 139. As described above, the maximum absolute curvature value at point B for the second non-circular portion 139 is equal to an absolute curvature value at point A for the first non-circular portion 138. Moreover, a radius of curvature of the border at point B has a minimum value, "r". Further, the curvature of the second non-circular portion 139 is configured to continuously change and to become zero at the end point D of the second non-circular portion 139. The second non-circular portion 139 joins the second straight side 134 at its end point D. As the curvature of the second non-circular portion 139 matches the zero curvature of the second straight side 132, the border has continuous curvature at point D. Moreover, a radius of curvature of the border at point D has infinite value.

In some implementations, the circular portion 136 extending from point A to point B is represented by a circular arc with a constant curvature value equal to the maximum absolute curvature value for the corner portion 130, namely the common absolute curvature value at point A for the first non-circular portion 138 and at point B for the second non-circular portion 139. Conversely, a radius of curvature for the circular portion 136 has a constant value of "r" equal to the minimum radius for the corner portion 130, namely the common radius of curvature value at point A for the first non-circular portion 139 and at point B for the second non-circular portion 139.

Moreover, a non-circular fraction "f" of the rounded corner 130 represented by the first and second non-circular portions 138, 139 can have a finite (non-zero) value larger than or equal to 1. In the example illustrated in FIG. 1A, the non-circular fraction of the rounded corner 130 is f≈0.67. That is a sum of a length of the first non-circular portion 138 (AC) and a length of the second non-circular portion 139 (BD) represents about ⅔ of a length of the rounded corner 130 (CD). In this case, a length of the circular portion 136 (AB) represents about ⅓ of the length of the rounded corner 130 (CD).

Figure 1B:
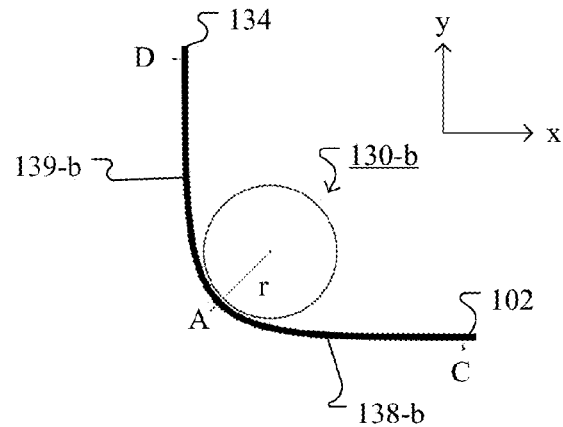
FIGS. 1B-1D show examples of rounded corners of a border for a GUI element rendered by the system illustrated in FIG. 1A.

FIG. 1B shows another instance 130-*b* of the rounded corner of the border for a GUI element rendered by the system illustrated in FIG. 1A. In the example illustrated in FIG. 1B, the non-circular fraction $f_b$ of the rounded corner 130-*b* is $f_b=1$. That is the rounded corner 130 (CD) consists of the first non-circular portion 138-*b* (extending from C to A) and the second non-circular portion 139-*b* (extending from A to D). In this case, the rounded corner 130-*b* has no circular portion, or alternatively, the circular portion of the rounded corner 130-*b* has collapsed to one point A.

Figure 1C:
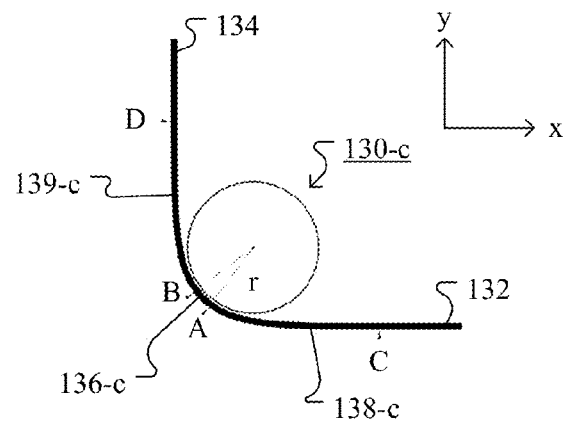

FIG. 1C shows yet another instance 130-*c* of the rounded corner of the border for a GUI element rendered by the system illustrated in FIG. 1A. In the example illustrated in FIG. 1C, the non-circular fraction $f_c$ of the rounded corner 130-*c* is $f_c≈0.9$. That is a sum of a length of the first non-circular portion 138-*c* (AC) and a length of the second non-circular portion 139-*c* (BD) represents about 9 out of 10 parts of a length of the rounded corner 130-*c* (CD). In this case, a length of the circular portion 136-*c* (AB) represents about 1 out of 10 parts of the length of the rounded corner 130-*c* (CD).

Figure 1D:
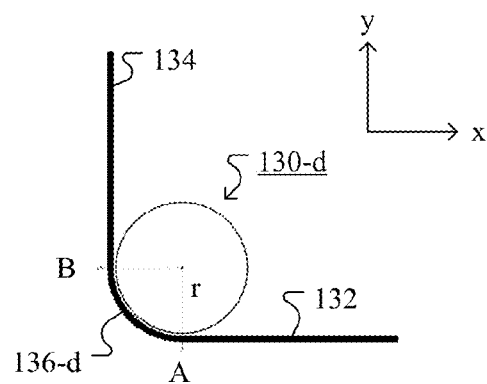

FIG. 1D shows a portion of a border for a GUI element with a different type of rounded corner 130-d. The rounded corner 130-d is arranged to join together the first and second straight sides 132, 134 and extends from point A to point B. In this case, however, the rounded corner 130-d is shaped as a circle arc 136-d with a finite (non-infinite) radius "r". In this manner, the first straight side 132 has constant, zero curvature, such that the curvature of the border to the right of point A is zero. The circle arc 136-d has constant, finite (non-zero) curvature such that the curvature of the border to the left of point A is non-zero, corresponding to the finite radius of curvature "r". Therefore, the border with rounded corner 130-d has discontinuous curvature at point A. Similarly, the second straight side 134 has constant, zero curvature, such that the curvature of the border above point B is zero. The circle arc 136-d has constant, finite (non-zero) curvature such that the curvature of the border below point B is non-zero, corresponding to the finite radius of curvature "r". Therefore, the border with rounded corner 130-d also has discontinuous curvature at point B.

Systems and techniques are now described to generate and render borders with continuous curvature, as the ones illustrated in FIGS. 1A, 1B and 1C.

Figure 2:
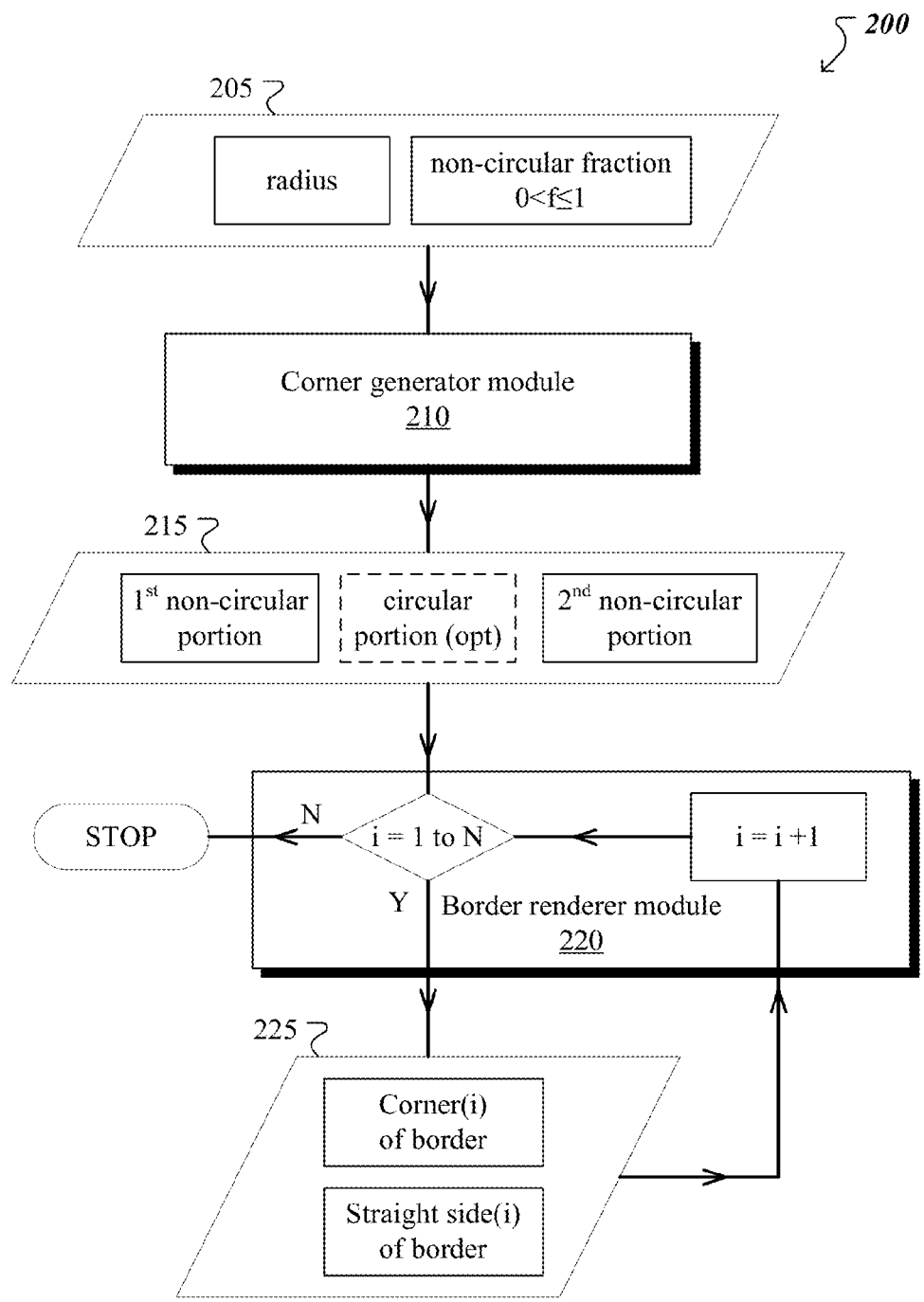
FIG. 2 is a block diagram of an example of a system used to render a border with continuous curvature for a GUI element.

FIG. 2 is a block diagram of an example of a system 200 used to render a border with continuous curvature for a GUI element. In some implementations, the system 200 is implemented in hardware, as one or more special purpose chips. In other implementations, the system 200 is implemented in software executed by one or more general purpose chips (e.g., a central processing unit, a graphical processing unit, or both). In some implementations, the system 200 is implemented as a combination of hardware and software. The system 200 can operate in conjunction with the system 100 described above in connection with FIG. 1A. In some implementations, the system 200 can be part of the system 100.

The system 200 includes a corner generator module 210 and a border renderer module 230. The corner generator module 210 is configured to receive or access input data 205 and to generate corner portion data 215 for a border with continuous curvature for a GUI element. In the example illustrated in FIG. 2, the input data 205 includes a radius of curvature, r, corresponding to a maximum curvature of the corner portion and a non-circular fraction, $0 < f \leq 1$, of the corner portion.

When the non-circular fraction referenced in the input data 205 is less than 1, f<1, the corner generator module 210 generates data 215 for a corner portion that includes first and second non-circular portions and a circular portion. The circular portion is connected to a first straight side of the border adjacent to the corner portion through the first non-circular portion, and to a second straight side of the border adjacent to the corner portion through the second non-circular portion. A radius of the circular portion is equal to the radius of curvature referenced in the input data 205. The curvatures of the first and second non-circular portions increase continuously from zero to a maximum curvature value corresponding to the radius of curvature referenced in the input data 205. In this manner, a portion of the border including (i) the first straight side, (ii) the corner portion corresponding to the corner portion data 215, and (iii) the second straight side has continuous curvature. For example, when the non-circular fraction is f≈0.67, the corner generator module 210 generates data 215 for a corner portion like the corner portion 130 described above in connection with FIG. 1A. As another example, when the non-circular fraction is f≈0.9, the corner generator module 210 generates data 215 for a corner portion like the corner portion 130-c described above in connection with FIG. 1C.

When the non-circular fraction is equal to 1, f=1, the corner generator module 210 generates data 215 for a corner portion that consists of a first non-circular portion connected to a first straight side of the border adjacent to the corner portion, and a second non-circular portion connected to a second straight side of the border adjacent to the corner portion. The curvatures of the first and second non-circular portions increase continuously from zero to a maximum curvature value corresponding to the radius of curvature referenced in the input data 205. In this case, the first and second non-circular portions are connected at a point where the curvature of the corner portion has the maximum curvature value. In this manner, a portion of the border including (i) the first straight side, (ii) the corner portion corresponding to the corner portion data 215, and (iii) the second straight side has continuous curvature. For example, when the non-circular fraction is f=1, the corner generator module 210 generates data 215 for a corner portion like the corner portion 130-b described above in connection with FIG. 1B.

Referring again to FIGS. 1A, 1B and 1C, one notes that each of the second non-circular portions 139, 139-b and 139-c is a mirrored-instance of the respective first non-circular portions 138, 138-b and 138-c with respect to a bisector of an angle formed by the first and second straight sides 132, 134 adjacent to the respective corner portion 130, 130-b and 130-c. Hence, the corner generator module 210 generates a first subset of the corner portion data 215 corresponding to the first non-circular portion of the corner portion. An example of a process that can be used by the corner generator module 210 to generate the first subset of the corner portion data 215 corresponding to the first non-circular portion is described below in connection with FIGS. 3A-3B. Subsequently, the corner generator module 210 can apply a mirror transformation to the generated first subset of the corner portion data 215 corresponding to the first non-circular portion to generate a second subset of the corner portion data 215 corresponding to the second non-circular portion of the corner portion. An axis of symmetry of the mirror transformation is the bisector of the angle between the first and second straight sides 132, 134.

Figure 3A:
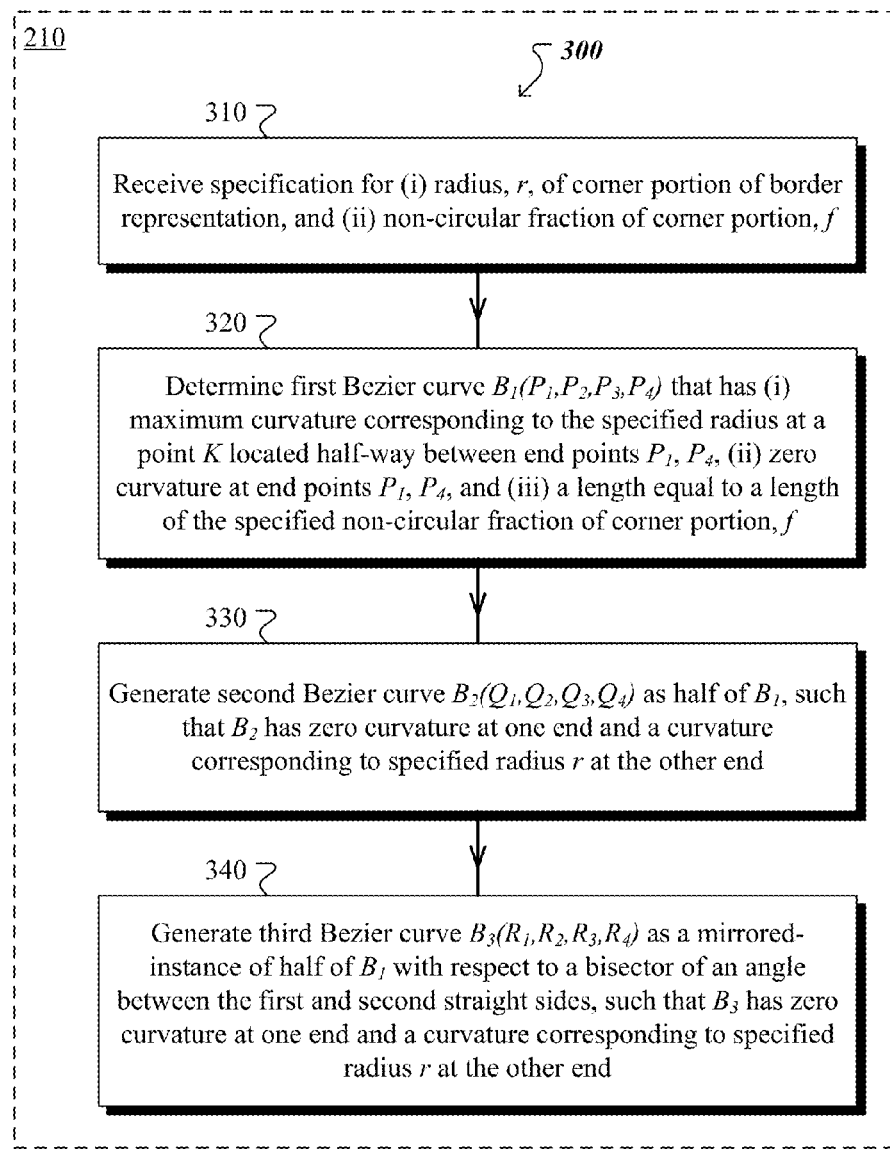
FIGS. 3A-3B show aspects of a process used to round a corner of a border with continuous curvature for a GUI element.
Figure 3B:
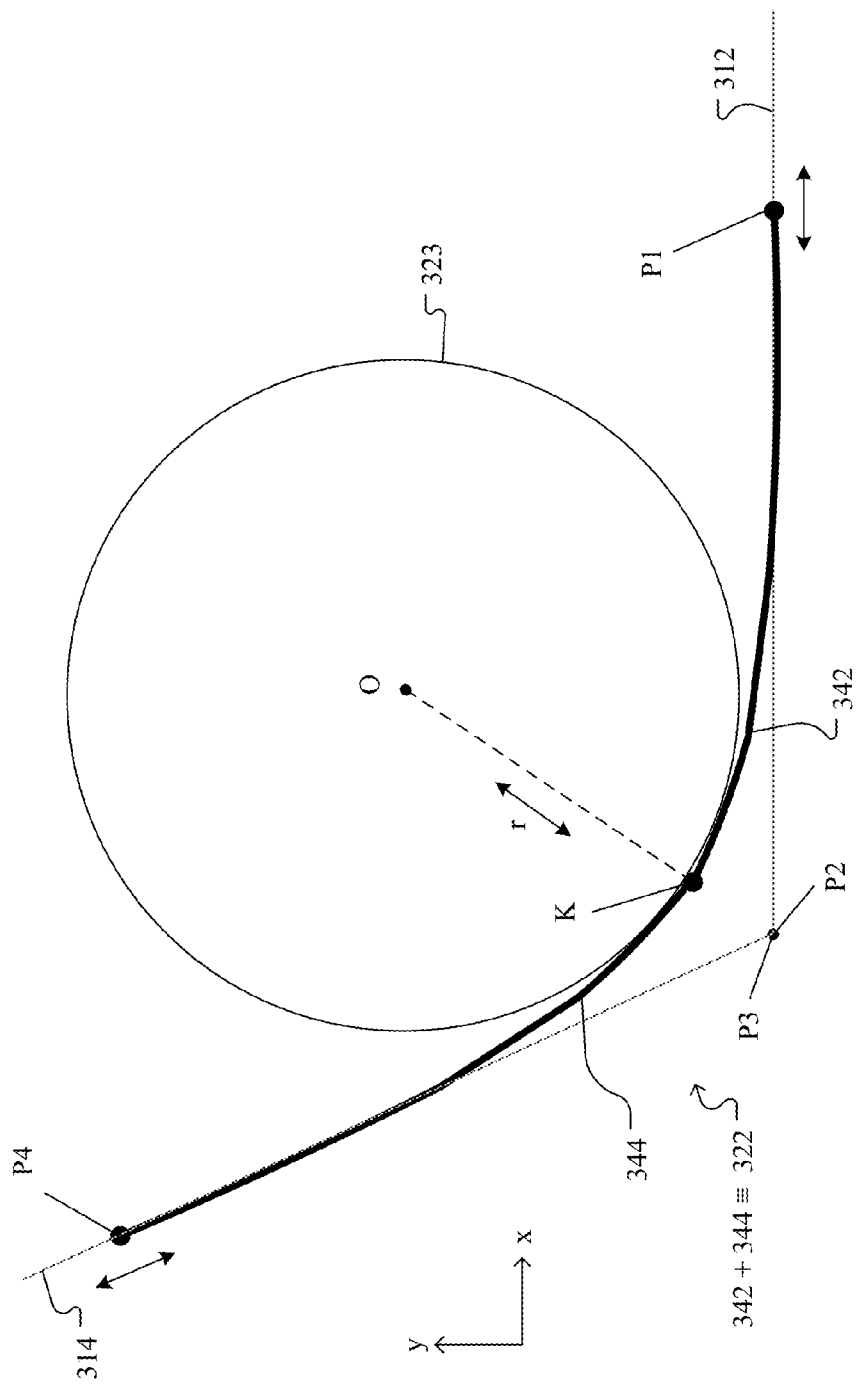

In some implementations, the first and second non-circular portions of the corner portion are B-spline curves. In some cases, the B-spline curves are non-uniform rational basis spline (NURBS) curves. In other cases, the B-spline curves are Bezier curves. In these implementations, the corner portion data 215 generated by the corner generator module 210 includes respective sets of control points for B-spline curves corresponding to the first and second non-circular portions of the corner portion. For instance, FIGS. 3A-3B show aspects of a process executed by the corner generator module 210 to generate (i) first control points of a first $3^{rd}$ order Bezier curve corresponding to the first non-circular portion, (ii) and second control points of a second $3^{rd}$ order Bezier curve corresponding to the second non-circular portion.

In other implementations, the first and second non-circular portions of the corner portion are Euler spirals (also known as Cornu spirals). In this case, corner portion data 215 generated by the corner generator module 210 includes respective sets of control points for portions of Euler spirals corresponding to the first and second non-circular portions of the rounded corner.

In some implementations, the corner generator module 210 generates a subset of the corner portion data 215 corresponding to the circular portion of the rounded corner as control points for a circular arc with a radius equal to the radius of curvature referenced in the input data 205. In other implementations, the corner generator module 210 generates another subset of the corner portion data 215 corresponding to the circular portion of the rounded corner as control points for a Bezier curve that approximates a circular arc with a radius equal to the radius of curvature referenced in the input data 205.

The border renderer module 220 is configured to receive or access the corner portion data 215 generated by the corner generator module 210 and to render a border with continuous curvature for a GUI element. The border renderer module 220 includes a loop with N iterations, where each of the N iterations corresponds to the rendering of one of N rounded corners of the border and an adjacent straight side of the border.

For instance during the first iteration, the border renderer module 220 uses a first subset of the corner portion data 215 corresponding to the first non-circular portion to render the first non-circular portion of the first rounded corner. Then, the border renderer module 220 uses a second subset of the corner portion data 215 corresponding to the circular portion to render the circular portion of the first rounded corner. Then, the border renderer module 220 uses a third subset of the corner portion data 215 corresponding to the second non-circular portion to render the second non-circular portion of the first rounded corner. Once the first rounded corner is rendered, the border renderer module 220 can render, during the first iteration, the first straight side of the border that is adjacent to the first rounded corner.

During the second iteration, the border renderer module 220 transforms (e.g., translates and rotates) the first subset of the corner portion data 215 corresponding to the first non-circular portion and then uses the transformed first subset to render the first non-circular portion of the second rounded corner. Then, the border renderer module 220 transforms (e.g., translates and rotates) the second subset of the corner portion data 215 corresponding to the circular portion and then uses the transformed second subset to render the circular portion of the second rounded corner. Then, the border renderer module 220 transforms (e.g., translates and rotates) the third subset of the corner portion data 215 corresponding to the second non-circular portion and then uses the transformed third subset to render the second non-circular portion of the second rounded corner. Once the second rounded corner is rendered, the border renderer module 220 can render, during the second iteration, the second straight side of the border that is adjacent to the second rounded corner.

And so on, the remaining iterations can be performed in a manner similar to the one described above in connection with the first and second iterations. At the end of the loop, the border renderer module 220 completes the rendering of the border with continuous curvature for a GUI element.

FIGS. 3A-3B show aspects of a process 300 for generating information used to round a corner of a border with continuous curvature for a GUI element. In some implementations, the process 300 can be executed by the corner generator module 210, described above in connection with FIG. 2. In this case, the corner generator module 210 applies the process 300 to input data 205 and outputs corner portion data 215 for a border with continuous curvature for a GUI element. In some implementations, the process 300 can be executed in conjunction with the system 100, described above in connection with FIG. 1A. In this case, the computer system 105 applies the process 300 to generate information used to render corner portions 130, 130-b, and 130-c for borders with continuous curvature of the GUI elements.

FIG. 3A is a flow chart of the process 300. At 310, a specification for a radius "r" of a corner portion of a border for a GUI element, and a specification for a non-circular fraction "f" of the corner portion are received. The specified value of the radius of curvature "r" determines a maximum curvature of a first and second non-circular portions of the corner portion. The specified value of the non-circular fraction "f" determines a combined length of the first and second non-circular portions of the corner portion.

One or both of these input values can be specified by another process that runs prior to or concurrently with process 300. Alternatively or additionally, one or both of these input values can be pre-specified as part of a design spec. A value of the specified radius of curvature can depend on the magnification at which a border of a GUI element is rendered on a display device. For example, for a given rounding proportion of a corner of the border, a large radius of curvature is specified for a zoom-in view of the border, while a small radius of curvature is specified for a zoom-out view of the border. As another example, the non-circular fraction of the corner portion can be specified based on empirical data gathered to determine a look of a rounded corner that is most pleasing to users of the GUIs. For instance, it may be determined that users prefer a look of rounded corners for which the non-circular fraction of the corner portion is 0.3, so this value will be specified as the non-circular fraction of the corner portion, at 310.

At 320, a first Bezier curve is determined that has (i) maximum curvature corresponding to the specified radius at a point located half-way between its end points, (ii) zero curvature at the end points, and (iii) a length equal to a length of the specified non-circular fraction of the corner portion. FIG. 3B shows a geometrical construct used to generate data for rendering the corner portion. Assume that line 312 corresponds to a first straight side of the corner portion. Here, the line 312 extends along the x-axis. The first Bezier curve $B_1$ 322 is a Bezier curve of $3^{rd}$ order with control points $\{P_1, P_2, P_3, P_4\}$.

End points $P_1$ and $P_4$ of the first Bezier curve $B_1$ 322 are located on the line 312 and on a line 314, respectively, such that the first Bezier curve B1 322 is tangent to the line 312 at point $P_1$ and to the line 314 at point $P_4$. When the control points $P_2$ and $P_3$ overlap and are located on the line 312, the first Bezier curve $B_1$ 322 is tangent to a circle 323 at point K, and the curvature at both points $P_1$ and $P_4$ is zero. In this manner, a maximum curvature of the first Bezier curve $B_1$ 322 occurs at point K, at the middle of the first Bezier curve $B_1$ 322. A rate of change in curvature at point K is zero. Moreover, as the circle 323 is adjusted (represented by the double-ended arrow) to have a radius equal to the specified radius of "r", a value of the maximum curvature at point K corresponds to the specified radius of curvature "r".

A bisector of an angle formed by the lines 312 and 314 passes through the overlapping control points $P_2$ and $P_3$, through the point K (where the curvature has a maximum value), and through the center point O of the circle 323, such that end points $P_1$ and $P_4$ mirror each other with respect to the bisector. In addition, coordinates of the end points $P_1$ and $P_4$ are adjusted (represented by the double-ended arrow) such that a length of the first Bezier curve $B_1$ 322 from $P_1$ to $P_4$ satisfies length constraints set by the specified fraction of the non-circular portion "f" of the rounded corner.

At 330, a second Bezier curve is generated as half of the first Bezier curve, such that the second Bezier curve has zero curvature at one end and a curvature corresponding to the specified radius at the other end. In the example illustrated in FIG. 3B, the first Bezier curve $B_1$ 322 is cut at point K into first half 342 and second half 344. The first half 342 is a second Bezier curve $B_2$ 342 that extends from point $P_1$ to point K and satisfies the following: (i) curvature of the second Bezier curve $B_2$ 342 is zero at end point P1; (ii) the curvature of the second Bezier curve $B_2$ 342 is maximum at the other end point K, and is determined by the specified radius of curvature, "r"; and (iii) a length of the second Bezier curve $B_2$ 342 corresponds to half the length of the non-circular portion of the rounded corner. In this manner, the second Bezier curve $B_2$ 342 represents the first non-circular portion of the rounded corner.

Output of step 330 is a first set of control points $\{Q_1, Q_2, Q_3, Q_4\}$ of the second Bezier curve $B_2$ 342. The control point Q1 is end point P1, and the control point Q4 is end point K. The remaining control points Q2 and Q3 are located along the line 312, as described below in connection with FIG. 4C. The control points $\{Q_1, Q_2, Q_3, Q_4\}$ of the second Bezier curve $B_2$ 342 can be used, e.g., by the border renderer module 220, to render the first non-circular portion of the rounded corner of a border for a GUI element.

At 340, a third Bezier curve is generated as a mirrored-instance of half of the first Bezier curve with respect to a bisector of an angle between the first and second straight sides, such that the third Bezier curve has zero curvature at one end and a curvature corresponding to specified radius at the other end. Once the first non-circular portion of the rounded corner is determined at step 330 as the second Bezier curve $B_2$ 342, the second non-circular portion of the rounded corner can be determined in the following manner. The second Bezier curve $B_2$ 342 is mirrored with respect to the bisector of the angle between the first and second straight sides adjacent to the rounded corner. The mirrored-instance of the second Bezier curve $B_2$ 342 is a third Bezier curve $B_3$ (not shown in FIG. 3B). By construction, the third Bezier curve $B_3$ satisfies the following: (i) curvature of the third Bezier curve $B_3$ is zero at one end point; (ii) the curvature of the third Bezier curve $B_3$ is maximum at the other end point, and is determined by the specified radius of curvature, "r"; and (iii) a length of the third Bezier curve $B_3$ corresponds to half the length of the non-circular portion of the rounded corner. In this manner, the third Bezier curve $B_3$ represents the second non-circular portion of the rounded corner.

Output of step 340 is a second set of control points $\{R_1, R_2, R_3, R_4\}$ of the third Bezier curve $B_3$. The control point $R_1$ is the end point where the curvature of the rounded corner has a maximum value, and the control point $R_4$ is the other end point where the curvature of the rounded corner is zero. The remaining control points $R_2$ and $R_3$ are located along the second straight side of the border, as described below in connection with FIG. 4C. The control points $\{R_1, R_2, R_3, R_4\}$ of the third Bezier curve $B_3$ can be used, e.g., by the border renderer module 220, to render the second non-circular portion of the rounded corner of a border for a GUI element.

The first set of control points $\{Q_1, Q_2, Q_3, Q_4\}$ of the second Bezier curve $B_2$ 342 and the second set of control points $\{R_1, R_2, R_3, R_4\}$ of the third Bezier curve $B_3$ form a subset of the corner portion data 215 output by the corner generator module 210 for a border with continuous curvature for a GUI element.

Figure 4A:
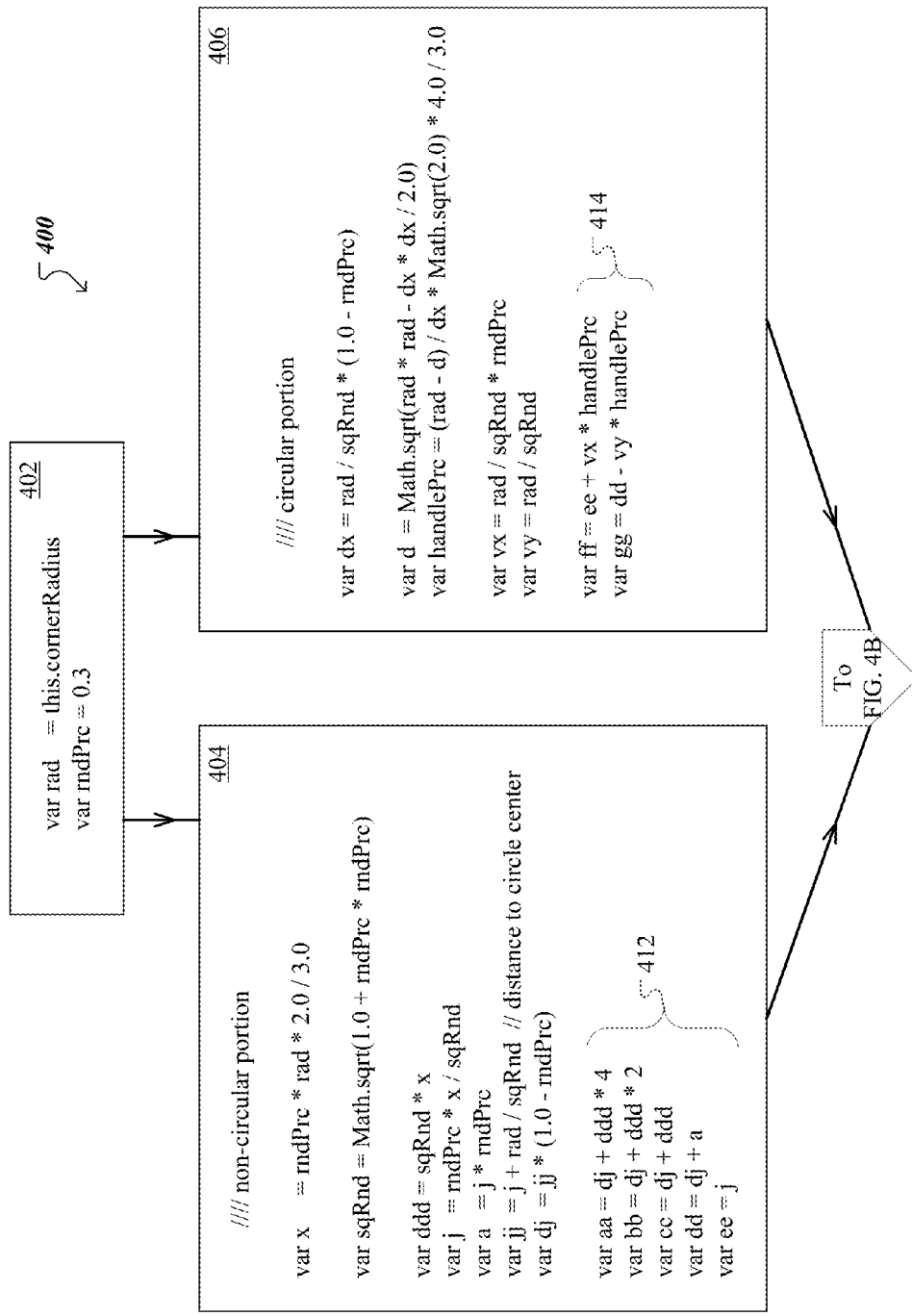

FIGS. 4A-4B show a block diagram of an example of a system 400 used to render a corner of a border with continuous curvature for a GUI element. In some implementations, the system 400 can be operated in conjunction with the system 200 or with the system 100. In some implementations, one or more modules or sub-modules of the system 400 can be used to perform at least a portion of the process 300.

In some implementations, the system 400 includes first and second input modules 402, 408, a first generator module 404 configured to generate first and second non-circular portions of a rounded corner, a second generator module 406 configured to generate a circular portion of the rounded corner, and a renderer module 410 configured to render a border with rounded corners and continuous curvature. In the examples shown in FIGS. 4A-4B, the first and second generator modules 404, 406 and the renderer module 410 are implemented as code. In other implementations, one, some or all modules of the system 400 can be implemented in hardware (e.g., specialized chips), or combinations of hardware and software.

The first input module 402 is configured to receive input data including a radius of curvature "rad" corresponding to a maximum curvature of the rounded corner and a non-circular fraction, $0 < rndPrc \le 1$, of the rounded corner.

The first generator module 404 receives the input data from the first input module 402 and outputs a first data set 412 associated with the non-circular portions of the rounded corner. The first data set 412 output by the first generator module 404 includes coordinates of four control points for $3^{rd}$ order Bezier curves used to render the non-circular portions of the rounded corner. The second generator module 406 receives the input data from the first input module 402 and outputs a second data set 414 associated with the circular portion of the rounded corner. In some implementations, the second data set 414 output by the second generator module 406 are coordinates of two "inner" control points for a $3^{rd}$ order Bezier curve used to approximate the circular portion of the rounded corner. In other implementations, the second data set 414 output by the second generator module 406 are coordinates of control points for a circular arc with radius equal to the input radius "rad" and used to render the circular portion of the rounded corner.

Figure 4C:
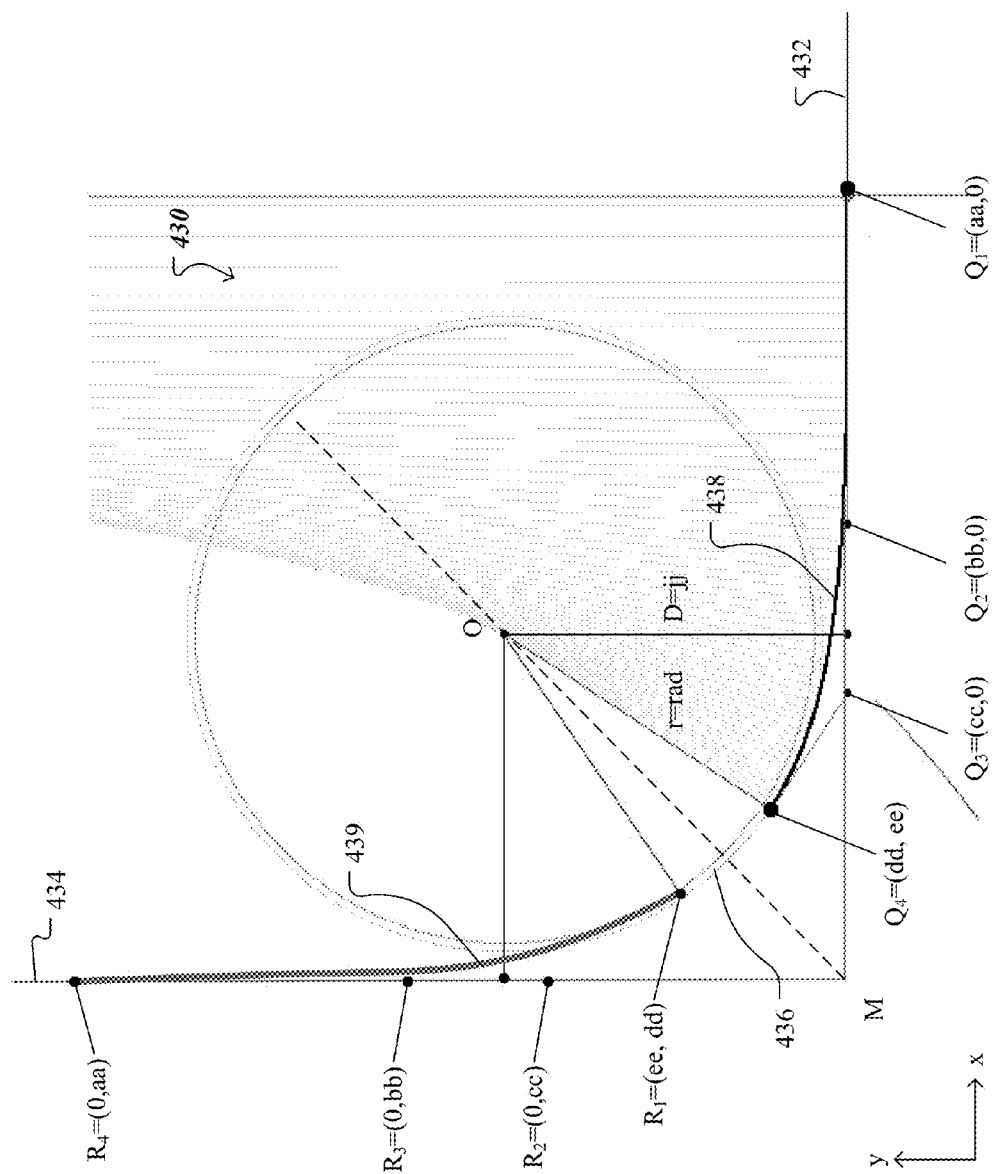

FIG. 4C shows a zoom-in view of a border of a GUI element in the vicinity of a rounded corner 430, and is used to show how the generated first and second data sets 412, 414 are used by the renderer module 410 to render the rounded corner 430. This portion of the border includes a portion of a first straight side 432 of the border, the rounded corner 430, and a portion of a second straight side 434 of the border. As this example represents the bottom left corner of the border, the first straight side 432 extends along the x-axis, from the bottom right corner of the border (located on the east-side of the second straight side 434 and not shown in FIG. 4C) to point $Q_1$. Further, the second straight side 434 extends along the y-axis, from the top left corner of the border (located on the north-side of the first straight side 432 and not shown in FIG. 4C) to point $R_4$. The rounded corner 430 joins together the first and second straight sides 432, 434 and extends from point $Q_1$ to point $R_4$. Moreover, the rounded corner 430 is shaped such that the portion of the border that includes the first straight side 432, the rounded corner 430 and the second straight side 434 is continuous and has continuous curvature.

The rounded corner 430 includes a first non-circular portion 438 extending from point $Q_1$ to point $Q_4$, and a second non-circular portion 439 extending from point $R_1$ to point $R_4$. The corner portion 430 further includes a circular portion 436 that extends from point $Q_4$ to point $R_1$, and joins together the first and second non-circular portions 438, 439.

In the example shown in FIG. 4C, the first non-circular portion 438 is a first $3^{rd}$ order Bezier curve having control points $\{Q_1, Q_2, Q_3, Q_4\}$. The first generator module 404 determines the coordinates 412 of the control points $\{Q_1(aa,0), Q_2(bb,0), Q_3(cc,0), Q_4(dd,ee)\}$, such that the first $3^{rd}$ order Bezier curve 438 satisfies the following: (i) curvature at end point $Q_1$ is zero; (ii) the curvature is maximum at end point $Q_4$, and is determined by the input radius of curvature, "rad"; and (iii) a length of the curve 438 from point $Q_1$ to point $Q_4$ corresponds to half the length of a total non-circular portion of the rounded corner 430, in accordance with the input non-circular fraction, "rndPrc".

Further in the example shown in FIG. 4C, the second non-circular portion 439 is a second $3^{rd}$ order Bezier curve having control points $\{R_1,R_2,R_3,R_4\}$. The control points for the second $3^{rd}$ order Bezier curve 439 are a mirrored-instance of the control points $\{Q_1,Q_2,Q_3,Q_4\}$ of the first $3^{rd}$ order Bezier curve 438 with respect to a bisector "MO" of an angle between the first and second straight sides 432, 434. Here, the origin of the Cartesian coordinate system is at point M(0,0). In this case, the mirrored-instance of the control points $\{Q_1, Q_2,Q_3,Q_4\}$ are the control points $\{R_1(ee,dd),R_2(0,cc),R_3(0,bb),R_4(0,aa)\}$ of the second $3^{rd}$ order Bezier curve 439. In this manner, the second $3^{rd}$ order Bezier curve 439 satisfies the following: (i) curvature is maximum at end point $R_1$, and is determined by the input radius of curvature, "rad"; (ii) the curvature at end point $R_4$ is zero; and (iii) a length of the curve 439 from point $R_1$ to point $R_4$ corresponds to half the length of a total non-circular portion of the rounded corner 430, in accordance with the input non-circular fraction, "rndPrc".

Furthermore in the example shown in FIG. 4O, the circular portion 436 is a third $3^{rd}$ order Bezier curve having control points $\{S_1,S_2,S_3,S_4\}$. Here, the end control points $S_1$(dd,ee) and $S_4$(ee,dd) of the third $3^{rd}$ order Bezier curve 436 are matching end control points $Q_4$ and $R_1$ of the first and second $3^{rd}$ order Bezier curves 438, 439, respectively. Moreover, the second generator module 406 determines the coordinates 414 of "inner" control points $S_2$(gg,ff) and $S_3$(ff,gg) of the third $3^{rd}$ order Bezier curve 436 (not shown in FIG. 4C.) In this manner, the third $3^{rd}$ order Bezier curve 436 approximates a circle arc with a radius equal to the input radius of curvature, "rad" and joins together the first and second non-circular portions 438, 439.

Referring now to FIG. 4B, the second input module 408 is configured to receive additional input data including a width "ww" and a height "hh" of the border. The renderer module 410 receives the additional input data from the second input module 408, the first data set 412 associated with the non-circular portions of the rounded corner from the first generator module 404, and the second data set 414 associated with the circular portion of the rounded corner from the second generator module 406.

A sub-module 416 of the renderer module 410 renders the bottom left corner of the border. This is explained herein with reference to FIG. 4C. Starting at point $Q_1$(aa,0), the sub-module 416 renders a first non-circular portion 438 of the rounded bottom left corner 430 as a $3^{rd}$ order Bezier curve with control points $\{Q_1(aa,0),Q_2(bb,0),Q_3(cc,0),Q_4(dd,ee)\}$. Next, the sub-module 416 renders a circular portion 436 of the rounded bottom left corner 430 as a $3^{rd}$ order Bezier curve with control points $\{Q_4(dd,ee),(gg,ff),(ff,gg),R_1(ee,dd)\}$. Next, the sub-module 416 renders a second non-circular portion 439 of the rounded bottom left corner 430 as a $3^{rd}$ order Bezier curve with control points $\{R_1(dd,ee),R_2(0,cc),R_3(0,bb),R_4(0,aa)\}$.

A sub-module 417 of the renderer module 410 renders a left side line 434 of the border. Starting at point $R_4$(0,aa), the sub-module 417 extends the left side line 434 to a first point of the top left corner of the border.

A sub-module 420 of the renderer module 410 renders the top left corner in a similar manner as described above in connection with the sub-module 416. The control points of the $3^{rd}$ order Bezier curves that correspond to the first non-circular portion, circular portion and second non-circular portion of the rounded top left corner are appropriately translated (by hh along the y-axis) and rotated (clockwise by 90° with respect to the z-axis, which is perpendicular to the page) relative to the control points associated with the bottom left corner. A sub-module 421 of the renderer module 410 renders a top line of the border. The sub-module 421 extends the top line to a first point of the top right corner of the border.

A sub-module 424 of the renderer module 410 renders the top right corner in a similar manner as described above in connection with the sub-module 416. The control points of the $3^{rd}$ order Bezier curves that correspond to the first non-circular portion, circular portion and second non-circular portion of the rounded top right corner are appropriately translated (by ww along the x-axis) and rotated (clockwise by 90° with respect to the z-axis) relative to the control points associated with the top left corner. A sub-module 425 of the renderer module 410 renders a right side line of the border. The sub-module 425 extends the right side line to a first point of the bottom right corner of the border.

A sub-module 428 of the renderer module 410 renders the bottom right corner in a similar manner as described above in connection with the sub-module 416. The control points of the $3^{rd}$ order Bezier curves that correspond to the first non-circular portion, circular portion and second non-circular portion of the rounded bottom right corner are appropriately translated (by hh along the y-axis) and rotated (clockwise by 90° with respect to the z-axis) relative to the control points associated with the top right corner. A sub-module 429 of the renderer module 410 renders a bottom line 432 of the border. The sub-module 429 extends the bottom line 432 to point Q1 of the bottom left corner of the border.

Operations performed by the sub-modules of the renderer module 410 can be performed sequentially, as described above or concurrently, if multiple processors (e.g., multiple threads of a single hardware processor, or multiple hardware processors) are available.

Figure 5:
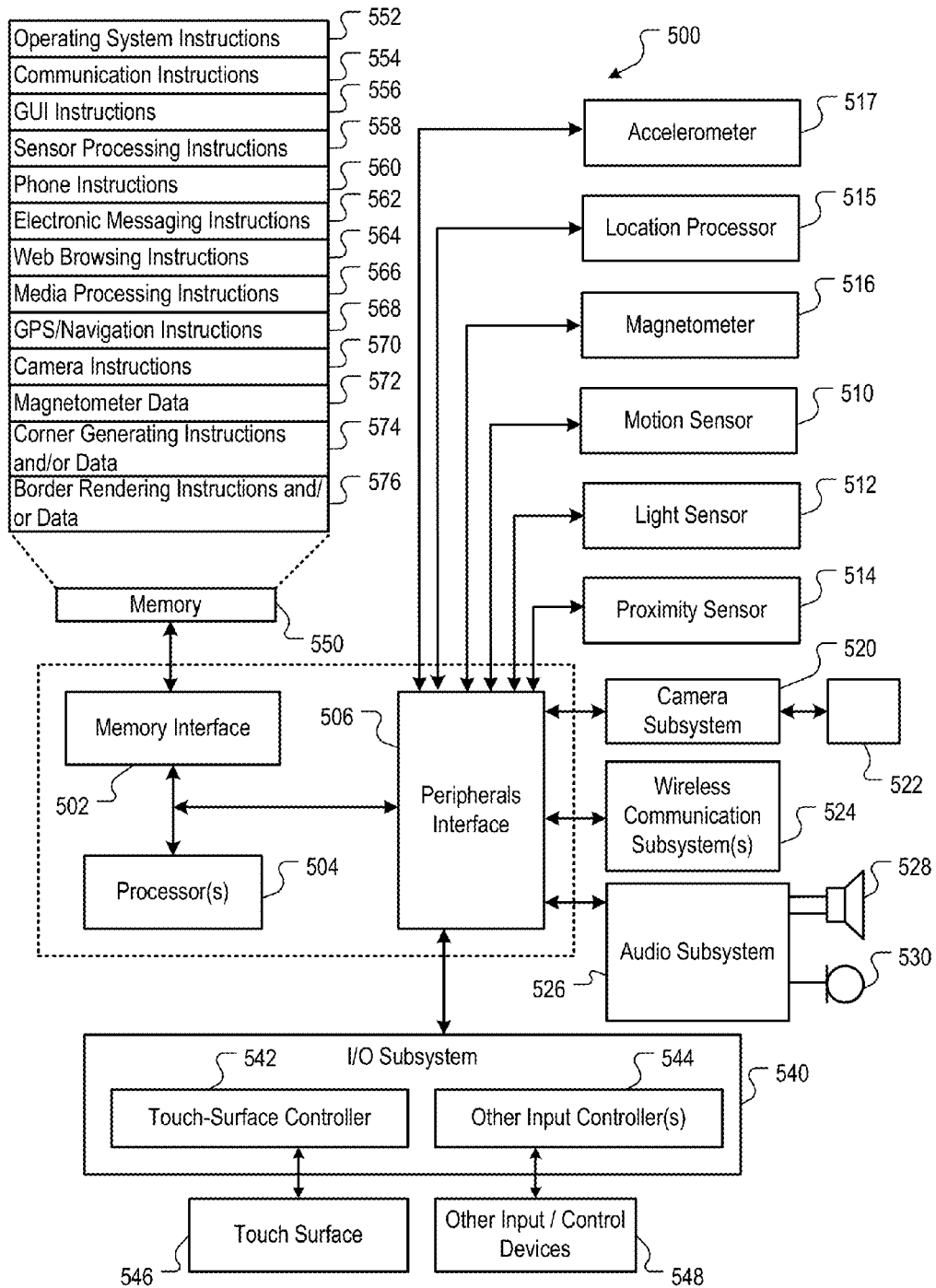
FIG. 5 is a block diagram of an example of a computer system operated according to the technologies described above in connection with FIGS. 1-4.

FIG. 5 is a block diagram of an example of a computer system 500 operated according to the technologies described above in connection with FIGS. 1-4. The computer system 500 can include memory interface 502, one or more data processors, image processors and/or processors 504, and peripherals interface 506. Memory interface 502, one or more processors 504 and/or peripherals interface 506 can be separate components or can be integrated in one or more integrated circuits. Processors 504 can include one or more application processors (APs) and one or more baseband processors (BPs). The application processors and baseband processors can be integrated in one single process chip. The various components in computer system 500, for example, can be coupled by one or more communication buses or signal lines.

Sensors, devices, and subsystems can be coupled to peripherals interface 506 to facilitate multiple functionalities. For example, motion sensor 510, light sensor 512, and proximity sensor 514 can be coupled to peripherals interface 506 to facilitate orientation, lighting, and proximity functions of the computer system 500. Location processor 515 (e.g., GPS receiver) can be connected to peripherals interface 506 to provide geopositioning. Electronic magnetometer 516 (e.g., an integrated circuit chip) can also be connected to peripherals interface 506 to provide data that can be used to determine the direction of magnetic North. Thus, electronic magnetometer 516 can be used as an electronic compass. Accelerometer 517 can also be connected to peripherals interface 506 to provide data that can be used to determine change of speed and direction of movement of the computer system 500.

Camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computer system 500 is intended to operate. For example, a computer system 500 can include communication subsystems 524 designed to operate over a GSM network, a GPRS network, an EDGE network, a Wi-Fi or WiMax network, and a Bluetooth network. In particular, the wireless communication subsystems 524 can include hosting protocols such that the computer system 500 can be configured as a base station for other wireless devices.

Audio subsystem 526 can be coupled to a speaker 528 and a microphone 530 to facilitate voice-enabled functions, such as voice recognition, voice replication, digital recording, and telephony functions.

I/O subsystem 540 can include touch surface controller 542 and/or other input controller(s) 544. Touch-surface controller 542 can be coupled to a touch surface 546 (e.g., a touch screen or touch pad). Touch surface 546 and touch surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 546.

Other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of speaker 528 and/or microphone 530.

In some implementation, a pressing of the button for a first duration may disengage a lock of the touch surface 546; and a pressing of the button for a second duration that is longer than the first duration may turn power to computer system 500 on or off. The user may be able to customize a functionality of one or more of the buttons. The touch surface 546 can, for example, also be used to implement virtual or soft buttons and/or a keyboard, such as a soft keyboard on a touch-sensitive display.

In some implementations, computer system 500 can present recorded audio and/or video files, such as MP3, AAC, and MPEG files. In some implementations, computer system 500 can include the functionality of an MP3 player, such as an iPod™. Computer system 500 may, therefore, include a pin connector that is compatible with the iPod. Other input/output and control devices can also be used.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can include a kernel (e.g., UNIX kernel).

Memory 550 may also store communication instructions 554 to facilitate communicating with one or more additional devices, one or more computers and/or one or more servers. Memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate Global Navigation Satellite System (GNSS) (e.g., GPS) and navigation-related processes and instructions; camera instructions 570 to facilitate camera-related processes and functions; magnetometer data and calibration instructions 572. The memory 550 may also store other software instructions (not shown), such as security instructions, web video instructions to facilitate web video-related processes and functions, and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 550.

Memory 550 can include corner generating instructions and data 574, and border rendering instructions and data 576 as described above in connection with FIGS. 1-4. For instance, the corner generating instructions 574 correspond to the process 300, or to code modules 404 and 406. Further, the memory 550 includes border rendering instructions 576 as described above in connection with to FIGS. 1A-1C and 2, or FIG. 4B. Furthermore, corner rounding data 574 includes the first and second non-circular portions, and optional circular portion of the corner 215, and border rendering data 576 includes the border 235 and another border {416, 417, 420, 421, 424, 425, 428, 429}, for instance.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of the computer system 500 may be implemented in hardware and/or in software, including in one or more signal processing and/or application specific integrated circuits.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
one or more hardware processors; and
non-transitory computer readable medium encoding instructions that, when executed by the one or more hardware processors, cause the system to render a border in a graphical user interface (GUI) on a display device associated with the system, wherein the border comprises
   a first straight side,
   a second straight side, and
   a corner portion that joins together the first straight side and the second straight side, such that a portion of the border that comprises the first straight side, the corner portion and the second straight side is continuous and has continuous curvature, wherein the corner portion comprises a first non-circular portion and a second non-circular portion, such that proximate ends of the first and second non-circular portions have a common curvature and distal ends have zero curvature.

2. The system of claim 1, wherein
the corner portion further comprises a circular portion with a radius corresponding to the common curvature, and
the circular portion is connected with the first straight side through the first non-circular portion and with the second straight side through the second non-circular portion.

3. The system of claim 2, wherein a length of the combined first and second non-circular portions is a specified fraction of a length of the corner portion.

4. The system of claim 3, wherein the radius of the circular portion and the fraction are pre-specified.

5. The system of claim 1, wherein the first and second non-circular portions are B-spline curves.

6. The system of claim 5, wherein the B-spline curves are Bezier curves.

7. The system of claim 6, wherein the Bezier curves are $3^{rd}$ order Bezier curves.

8. The system of claim 5, wherein the B-spline curves are non-uniform rational basis spline (NURBS) curves.

9. The system of claim 1, wherein the first and second non-circular portions are portions of Euler spirals.

10. The system of claim 1, wherein the border is part of an icon representation of the GUI.

11. The system of claim 1, wherein
the GUI comprises a keyboard representation, and
the border is part of a representation of a key from among a plurality of keys of the keyboard representation.

12. The system of claim 1, wherein the border is part of a text box representation of the GUI.

13. The system of claim 1, wherein the border is part of an image representation of the GUI.

14. A system comprises:
means for generating a border of a control or indicator to be rendered in a graphical user interface (GUI), wherein the border comprises
   a first straight side,
   a second straight side, and
   a corner portion that joins together the first straight side and the second straight side, such that a portion of the border that comprises the first straight side, the corner portion and the second straight side is continuous and has continuous curvature, wherein the corner portion comprises a first non-circular portion and a second non-circular portion, such that proximate ends of the first and second non-circular portions have a common curvature and distal ends have zero curvature; and
a hardware processor to render the border of the control or indicator in the GUI.

15. The system of claim 14, wherein the means for generating the border is configured to
receive specification of a fraction of a length of the corner portion represented by a length of the combined first and second non-circular portions, and of a radius corresponding to the common curvature;
determine a Bezier curve that has (i) maximum curvature corresponding to specified radius at a point located halfway between its end points, (ii) zero curvature at the end points, and (iii) a length equal to the fraction of the length of the corner portion; and
generate (I) the first non-circular portion as half of the Bezier curve and (II) the second non-circular portion as a mirrored-instance of the half of the Bezier curve with respect to a bisector of an angle between the first and second straight sides, such that each of the first and second non-circular portions has zero curvature at one end and the common curvature corresponding to the specified radius at the other end.

16. The system of claim 15, wherein the Bezier curve is a $3^{rd}$ order Bezier curve.

17. The system of claim 14, wherein
the corner portion further comprises a circular portion with a radius corresponding to the common curvature, and
the circular portion is connected with the first straight side through the first non-circular portion and with the second straight side through the second non-circular portion.

18. The system of claim 17, wherein the circular portion is a circular arc.

19. The system of claim 17, wherein the circular portion is approximated by a B-spline curve.

20. A method comprising:
generating, by a computer system, a border of a control or indicator to be represented in a graphical user interface (GUI),
   wherein the border comprises
      a first straight side,
      a second straight side, and
      a corner portion that joins together the first straight side and the second straight side, such that a portion of the border that comprises the first straight side, the corner portion and the second straight side is continuous and has continuous curvature, wherein the corner portion comprises a first non-circular portion and a second non-circular portion, and
   wherein said generating the border comprises arranging the first and second non-circular portions to have zero curvature at distal ends and a common curvature at proximal ends; and
representing, by the computer system in the GUI, the border of the control or indicator.

21. The method of claim 20, wherein said generating the border comprises
receiving specification of a fraction of a length of the corner portion represented by a length of the combined first and second non-circular portions, and of a radius corresponding to the common curvature;
determining a B-spline curve that has (i) maximum curvature corresponding to specified radius at a point located half-way between its end points, (ii) zero curvature at the end points, and (iii) a length equal to the fraction of the length of the corner portion; and generating (I) the first non-circular portion as half of the B-spline curve and (II) the second non-circular portion as a mirrored-instance of the half of the B-spline curve with respect to a bisector of an angle between the first and second straight sides, such that each of the first and second non-circular portions has zero curvature at one end and the common curvature corresponding to the specified radius at the other end.

22. The method of claim 21, wherein the B-spline curve is a Bezier curve.

23. The method of claim 22, wherein the Bezier curve is a $3^{rd}$ order Bezier curve.

24. The method of claim 20, wherein
the corner portion further comprises a circular portion with a radius corresponding to the common curvature, and
said generating the border comprises connecting the circular portion with the first straight side through the first non-circular portion and with the second straight side through the second non-circular portion.

25. The method of claim 24, wherein said generating the border comprises generating the circular portion as a circular arc.

26. The method of claim 24, wherein said generating the border comprises generating the circular portion as a B-spline curve.

27. A device, comprising:
a display;
one or more processors; and
memory storing one or more programs, the one or more programs including instructions which, when executed by the one or more processors, cause the device to:
receive a request to display a user interface element with one or more curved corners; and
in response to receiving the request to display the user interface element, displaying the user interface element on the display with a curved boundary, wherein generating the curved boundary includes:
in accordance with a determination that the user interface element has a first set of one or more dimension parameters, generating, via the one or more processors, a first shape for the boundary of the user interface element, wherein the first shape includes:
a first straight side of the first shape,
a second straight side of the first shape, and
a corner portion of the first shape that joins together the first straight side of the first shape and the second straight side of the first shape, such that a portion of the boundary of the first shape that comprises the first straight side, the corner portion and the second straight side is continuous and has continuous curvature, wherein the corner portion of the first shape comprises a first non-circular portion and a second non-circular portion, such that proximate ends of the first and second non-circular portions of the first shape have a same first curvature, wherein the first curvature is determined based at least in part on the first set of dimensional parameters; and
in accordance with a determination that the user interface element has a second set of one or more dimension parameters different from the first set of dimension parameters, generating, via the one or more processors, a second shape for the boundary of the user interface element, wherein the second shape includes:
a first straight side of the second shape,
a second straight side of the second shape, and
a corner portion of the second shape that joins together the first straight side of the second shape and the second straight side of the second shape, such that a portion of the boundary of the second shape that comprises the first straight side, the corner portion and the second straight side is continuous and has continuous curvature, wherein the corner portion of the second shape comprises a first non-circular portion and a second non-circular portion, such that proximate ends of the first and second non-circular portions of the second shape have a same second curvature, wherein the second curvature is determined based at least in part on the second set of dimensional parameters and is different from the first curvature.

28. A method, comprising:
receiving a request to display a user interface element with one or more curved corners; and
in response to receiving the request to display the user interface element, displaying the user interface element on a display with a curved boundary,
wherein generating the curved boundary includes:
in accordance with a determination that the user interface element has a first set of one or more dimension parameters, generating, via one or more processors, a first shape for the boundary of the user interface element, wherein the first shape includes:
a first straight side of the first shape,
a second straight side of the first shape, and
a corner portion of the first shape that joins together the first straight side of the first shape and the second straight side of the first shape, such that a portion of the boundary of the first shape that comprises the first straight side, the corner portion and the second straight side is continuous and has continuous curvature, wherein the corner portion of the first shape comprises a first non-circular portion and a second non-circular portion, such that proximate ends of the first and second non-circular portions of the first shape have a same first curvature, wherein the first curvature is determined based at least in part on the first set of dimensional parameters; and
in accordance with a determination that the user interface element has a second set of one or more dimension parameters different from the first set of dimension parameters, generating, via the one or more processors, a second shape for the boundary of the user interface element, wherein the second shape includes:
a first straight side of the second shape,
a second straight side of the second shape, and
a corner portion of the second shape that joins together the first straight side of the second shape and the second straight side of the second shape, such that a portion of the boundary of the second shape that comprises the first straight side, the corner portion and the second straight side is continuous and has continuous curvature, wherein the corner portion of the second shape comprises a first non-circular portion and a second non-circular portion, such that proximate ends of the first and second non-circular portions of the second shape have a same second curvature, wherein the second curvature is determined based at least in part on the second set of dimensional parameters and is different from the first curvature.

29. A non-transitory computer-readable medium encoding instructions that, when executed by data processing apparatus, cause the data processing apparatus to perform operations comprising:

receiving a request to display a user interface element with one or more curved corners; and in response to receiving the request to display the user interface element, displaying the user interface element on a display with a curved boundary, wherein generating the curved boundary includes:

in accordance with a determination that the user interface element has a first set of one or more dimension parameters, generating a first shape for the boundary of the user interface element, wherein the first shape includes:

a first straight side of the first shape, a second straight side of the first shape, and a corner portion of the first shape that joins together the first straight side of the first shape and the second straight side of the first shape, such that a portion of the boundary of the first shape that comprises the first straight side, the corner portion and the second straight side is continuous and has continuous curvature, wherein the corner portion of the first shape comprises a first non-circular portion and a second non-circular portion, such that proximate ends of the first and second non-circular portions of the first shape have a same first curvature, wherein the first curvature is determined based at least in part on the first set of dimensional parameters; and in accordance with a determination that the user interface element has a second set of one or more dimension parameters different from the first set of dimension parameters, generating a second shape for the boundary of the user interface element, wherein the second shape includes:

a first straight side of the second shape, a second straight side of the second shape, and a corner portion of the second shape that joins together the first straight side of the second shape and the second straight side of the second shape, such that a portion of the boundary of the second shape that comprises the first straight side, the corner portion and the second straight side is continuous and has continuous curvature, wherein the corner portion of the second shape comprises a first non-circular portion and a second non-circular portion, such that proximate ends of the first and second non-circular portions of the second shape have a same second curvature, wherein the second curvature is determined based at least in part on the second set of dimensional parameters and is different from the first curvature.

* * * * *